US012771668B2

(12) United States Patent
Parla et al.

(10) Patent No.: US 12,771,668 B2
(45) Date of Patent: Oct. 20, 2026

(54) DYNAMIC PLACEMENT OF COMPENSATING CONTROLS ON DPU AND eBPF BASED ON WORKLOAD, TRUST, AND THREAT SCORING

(71) Applicant: Cisco Technology, Inc., San Jose, CA (US)

(72) Inventors: Vincent Parla, North Hampton, NH (US); Stephen Craig Connors, Jr., Nashville, TN (US)

(73) Assignee: Cisco Technology, Inc., San Jose, CA (US)

( * ) Notice: Subject to any disclaimer, the term of this patent is extended or adjusted under 35 U.S.C. 154(b) by 189 days.

(21) Appl. No.: 18/537,516

(22) Filed: Dec. 12, 2023

(65) Prior Publication Data

US 2025/0039220 A1 Jan. 30, 2025

Related U.S. Application Data

(60) Provisional application No. 63/516,448, filed on Jul. 28, 2023.

(51) Int. Cl.
*H04L 9/40* (2022.01)
*H04L 9/32* (2006.01)
(Continued)

(52) U.S. Cl.
CPC ........ *H04L 63/0236* (2013.01); *H04L 9/3247* (2013.01); *H04L 41/0806* (2013.01);
(Continued)

(58) Field of Classification Search
CPC ............. H04L 63/0236; H04L 63/0218; H04L 63/0263; H04L 63/1425; H04L 63/145; H04L 63/166; H04L 63/20
See application file for complete search history.

(56) References Cited

U.S. PATENT DOCUMENTS

| | | | | |
|---|---|---|---|---|
| 9,015,301 B2 * | 4/2015 | Redlich | ............... | G06F 21/6254 707/777 |
| 9,692,778 B1 * | 6/2017 | Mohanty | ............. | G06F 9/45533 |

(Continued)

OTHER PUBLICATIONS

Makrakis, Georgios Michail, et al. "Vulnerabilities and attacks against industrial control systems and critical infrastructures." arXiv preprint arXiv:2109.03945 (2021).*

(Continued)

*Primary Examiner* — Jimmy H Tran
(74) *Attorney, Agent, or Firm* — Polsinelli P.C.

(57) ABSTRACT

A system and method are provided for dynamically placing security controls in a network infrastructure. Input values representing the workload are ingested. A network component is placed in front of the workload to process/filter ingress traffic into the workload. The input values are analyzed to determine the asset criticality of the workload and to determine which vulnerabilities to which the workload is susceptible. Based on this analysis of the input values, compensating controls are selected to protect the workload from the determined vulnerabilities, and the network component is dynamically programed to perform these compensating controls on the ingress traffic. The network component is located directly in front of the workload, and it can be a data processing unit (DPU), a Berkley packet filter (BPF), and/or an extended BPF (eBPF) capability.

20 Claims, 9 Drawing Sheets

(51) Int. Cl.

| | |
|---|---|
| ***H04L 41/0806*** | (2022.01) |
| ***H04L 41/0816*** | (2022.01) |
| ***H04L 41/082*** | (2022.01) |
| ***H04L 41/0869*** | (2022.01) |
| ***H04L 41/0895*** | (2022.01) |
| ***H04L 43/50*** | (2022.01) |
| ***H04L 45/24*** | (2022.01) |
| ***H04L 45/80*** | (2022.01) |

(52) U.S. Cl.

CPC ........ *H04L 41/0816* (2013.01); *H04L 41/082* (2013.01); *H04L 41/0869* (2013.01); *H04L 41/0895* (2022.05); *H04L 43/50* (2013.01); *H04L 45/24* (2013.01); *H04L 45/80* (2022.05); *H04L 63/0218* (2013.01); *H04L 63/0263* (2013.01); *H04L 63/0435* (2013.01); *H04L 63/123* (2013.01); *H04L 63/1425* (2013.01); *H04L 63/1433* (2013.01); *H04L 63/145* (2013.01); *H04L 63/166* (2013.01); *H04L 63/20* (2013.01)

(56) References Cited

U.S. PATENT DOCUMENTS

| | | | | |
|---|---|---|---|---|
| 9,800,605 | B2 * | 10/2017 | Baikalov | H04L 63/1433 |
| 10,200,399 | B2 * | 2/2019 | Agarwal | G06F 21/577 |
| 10,742,557 | B1 * | 8/2020 | Miriyala | H04L 49/70 |
| 11,119,739 | B1 * | 9/2021 | Allen | H04L 63/0263 |
| 11,507,353 | B1 * | 11/2022 | Soeters | G06F 8/60 |
| 11,916,880 | B1 * | 2/2024 | Allen | H04L 63/0263 |
| 11,962,697 | B2 * | 4/2024 | Paripally | H04L 9/32 |
| 12,381,901 | B1 * | 8/2025 | Golden | G06F 21/57 |
| 2011/0188386 | A1 * | 8/2011 | Nicholson | H04L 43/50 370/252 |
| 2013/0298192 | A1 * | 11/2013 | Kumar | H04L 63/1425 726/25 |
| 2014/0258541 | A1 * | 9/2014 | Di Benedetto | H04L 12/6418 709/226 |
| 2014/0362857 | A1 * | 12/2014 | Guichard | H04L 45/306 370/392 |
| 2015/0033340 | A1 * | 1/2015 | Giokas | H04L 63/1433 726/23 |
| 2015/0271193 | A1 * | 9/2015 | Estes | H04L 63/1416 726/23 |
| 2016/0036838 | A1 * | 2/2016 | Jain | H04L 63/1416 726/23 |
| 2016/0226905 | A1 * | 8/2016 | Baikalov | H04L 63/1433 |
| 2016/0261460 | A1 * | 9/2016 | Shi | H04L 65/611 |
| 2017/0134422 | A1 * | 5/2017 | Shieh | H04L 63/1408 |
| 2018/0241627 | A1 * | 8/2018 | Rodrigues | H04L 41/0813 |
| 2018/0337939 | A1 * | 11/2018 | Agarwal | G06F 16/26 |
| 2019/0058649 | A1 * | 2/2019 | Qi | H04L 43/14 |
| 2019/0173845 | A1 * | 6/2019 | Phillips | H04L 63/0263 |
| 2020/0092201 | A1 * | 3/2020 | Tillotson | H04L 45/306 |
| 2020/0162498 | A1 * | 5/2020 | Ababtain | H04L 63/1416 |
| 2020/0236045 | A1 * | 7/2020 | Bays | H04L 45/74 |
| 2020/0280566 | A1 * | 9/2020 | Raj | H04L 63/126 |
| 2020/0313999 | A1 * | 10/2020 | Lee | H04L 43/0847 |
| 2020/0336465 | A1 * | 10/2020 | Mestery | H04L 63/0263 |
| 2020/0374310 | A1 * | 11/2020 | Misra | H04L 63/0236 |
| 2020/0403912 | A1 * | 12/2020 | Allen | H04L 47/822 |
| 2021/0211408 | A1 * | 7/2021 | Porras | G06N 3/045 |
| 2021/0377719 | A1 * | 12/2021 | Du | H04L 63/1433 |
| 2022/0012340 | A1 * | 1/2022 | Rao | G06F 21/577 |
| 2022/0046045 | A1 * | 2/2022 | Rao | G06F 21/577 |
| 2022/0067174 | A1 * | 3/2022 | Gupta | G06F 21/566 |
| 2022/0070279 | A1 * | 3/2022 | Pang | G06F 21/577 |
| 2022/0103592 | A1 * | 3/2022 | Semel | H04L 63/1416 |
| 2022/0103593 | A1 * | 3/2022 | Singh | H04L 63/0245 |
| 2022/0191248 | A1 * | 6/2022 | Pieczul | H04L 63/0227 |
| 2022/0210065 | A1 * | 6/2022 | Khanna | H04L 45/74 |
| 2022/0222337 | A1 * | 7/2022 | Doshi | G06F 21/53 |
| 2022/0321532 | A1 * | 10/2022 | Du | H04L 43/062 |
| 2022/0329616 | A1 * | 10/2022 | O'Hearn | G06F 9/545 |
| 2022/0345483 | A1 * | 10/2022 | Shua | H04L 9/0825 |
| 2022/0353297 | A1 * | 11/2022 | Sharma | H04L 63/0263 |
| 2022/0385631 | A1 * | 12/2022 | McDowall | H04L 63/0236 |
| 2022/0417257 | A1 * | 12/2022 | Behl | H04L 63/1416 |
| 2023/0008901 | A1 * | 1/2023 | McDowall | H04W 12/088 |
| 2023/0069738 | A1 * | 3/2023 | Sreedhar | H04L 63/1433 |
| 2023/0095870 | A1 * | 3/2023 | Du | H04L 63/1416 726/23 |
| 2023/0105491 | A1 * | 4/2023 | Ganguli | H04L 47/781 709/226 |
| 2023/0125310 | A1 * | 4/2023 | Zhang | H04L 63/1425 726/22 |
| 2023/0231860 | A1 * | 7/2023 | Tian | H04L 63/1416 726/1 |
| 2023/0269237 | A1 * | 8/2023 | Sirineni | H04L 63/1408 726/12 |
| 2023/0275917 | A1 * | 8/2023 | Karmali | G06F 16/9537 709/224 |
| 2023/0291769 | A1 * | 9/2023 | Talur | H04L 63/20 |
| 2023/0319114 | A1 * | 10/2023 | Kaimal | H04L 63/20 726/9 |
| 2023/0336414 | A1 * | 10/2023 | Miriyala | G06F 9/541 |
| 2024/0078319 | A1 * | 3/2024 | Jung | G06F 21/577 |
| 2024/0121263 | A1 * | 4/2024 | Humphrey | H04L 51/224 |
| 2024/0129321 | A1 * | 4/2024 | Howe | H04L 63/20 |
| 2024/0129338 | A1 * | 4/2024 | Azad | H04L 63/1416 |
| 2024/0143777 | A1 * | 5/2024 | Kundu | G06F 21/577 |
| 2024/0176891 | A1 * | 5/2024 | Hendela | G06F 11/3604 |
| 2024/0223454 | A1 * | 7/2024 | Miriyala | H04L 63/20 |
| 2024/0232337 | A1 * | 7/2024 | Jadhav | G06F 21/552 |
| 2024/0235959 | A1 * | 7/2024 | Browne | G06F 1/3228 |
| 2024/0241944 | A1 * | 7/2024 | Smith | G06N 7/01 |
| 2024/0289462 | A1 * | 8/2024 | Larkin | G06F 21/572 |
| 2024/0289745 | A1 * | 8/2024 | Larkin | G06F 21/572 |
| 2024/0291835 | A1 * | 8/2024 | Sethi | H04L 63/1425 |
| 2024/0303171 | A1 * | 9/2024 | Larkin | G06F 9/545 |
| 2024/0333756 | A1 * | 10/2024 | Useckas | H04L 63/0236 |
| 2024/0364744 | A1 * | 10/2024 | Baker | H04L 63/20 |
| 2024/0372880 | A1 * | 11/2024 | Bansal | H04L 63/1416 |
| 2024/0406216 | A1 * | 12/2024 | Quiros | H04L 67/101 |
| 2024/0422201 | A1 * | 12/2024 | Bruce | H04L 63/0428 |
| 2024/0430680 | A1 * | 12/2024 | Rappard | H04L 63/20 |
| 2025/0016029 | A1 * | 1/2025 | Miriyala | H04L 45/66 |
| 2025/0016135 | A1 * | 1/2025 | McDowall | H04L 63/1433 |
| 2025/0030712 | A1 * | 1/2025 | Saraf | H04L 63/1425 |
| 2025/0031044 | A1 * | 1/2025 | Verma | H04L 63/205 |
| 2025/0039143 | A1 * | 1/2025 | Parla | H04L 63/0218 |
| 2025/0039146 | A1 * | 1/2025 | Zhang | H04L 63/0272 |
| 2025/0039155 | A1 * | 1/2025 | Bansal | H04L 63/0414 |
| 2025/0063063 | A1 * | 2/2025 | Tishbi | G06F 16/9024 |
| 2025/0080574 | A1 * | 3/2025 | Shua | H04L 63/1416 |
| 2025/0133121 | A1 * | 4/2025 | Crabtree | H04L 63/1433 |
| 2025/0350647 | A1 * | 11/2025 | Ganguli | H04L 63/08 |
| 2026/0058973 | A1 * | 2/2026 | Kaleli | H04L 41/16 |

OTHER PUBLICATIONS

Fournier, Guillaume. "Process level network security monitoring and enforcement with eBPF." Symposium sur la securite des technologies de l'information et des communications. 2020.*

Hatonen S., et al., "Programmable Session Layer Multi-Connectivity", IEEE Access, vol. 10, Published on Dec. 23, 2021, Current Version Jan. 18, 2022 pp. 5736-5752.

International Search Report and Written Opinion for International Application No. PCT/US2024/039882, mailed Sep. 25, 2024, 14 Pages.

Ermerins et al., "Transparent Malicious Traffic Detection and Mitigation Using the Nvidia Bluefield DPU," University Of Amsterdam, Jul. 5, 2021, pp. 1-25.

* cited by examiner

DYNAMIC PLACEMENT OF COMPENSATING CONTROLS ON DPU AND eBPF BASED ON WORKLOAD, TRUST, AND THREAT SCORING

CROSS-REFERENCE TO RELATED APPLICATIONS

This application priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

BACKGROUND

A firewall is a network security system that monitors and controls incoming and outgoing network traffic based on predetermined security rules. A firewall typically establishes a barrier between a trusted network and an untrusted network, such as the internet.

As new software vulnerabilities become known the firewall can be upgraded to add protections against the newly discovered vulnerabilities. Additionally, the newly discovered vulnerabilities can be remedied by patching the software that is susceptible to the vulnerabilities. Both solutions (i.e., the firewall upgrade and the software patch) can take a significant amount of time to develop, test, and then finally deploy. In the interim, workloads that are running the software remain at risk due to the vulnerabilities. Thus, it is desirable to have improved cybersecurity solutions that can be deployed more quickly to mitigate the newly discovered vulnerabilities.

Further, each additional protection added to a firewall comes at the expense of additional computational cost, which can take away compute capacity from other functions due to limited computational resources. In general, the number of vulnerabilities only increases, and so do the protections added to a firewall. Many protections end up being added to the firewall for precautionary reasons without knowing if the workload is actually susceptible to the vulnerabilities that the added protections are intended to guard against. Due to this, firewalls can suffer from the number of protections/rules proliferating without any of the protections/rules (or very few) being removed, resulting in cases in which as many as two-thirds of the protections/rules fail to provide value for the given workload. Thus, it is desirable to have improved solutions that can be more agile with respect to adding and removing protections/rules. And it is desirable to have improved solutions that better determine which protections/rules are tailored to the particular vulnerabilities of the workload.

Moreover, firewalls are generally placed near the entrance/boundary of a trusted network, rather than near the workload. When the network has different workloads that are susceptible to different vulnerabilities, the firewall provides a one-size-fits-all solution that protects against all the vulnerabilities of the different workloads in the network. For example, the firewall can filter all the incoming traffic for signatures of all possible cyber attacks to which any of the workloads may be susceptible. This one-size-fits-all solution can be less efficient than a more fine-grained approach. Thus, it is desirable to have more efficient solutions that provide more fine-grained protections on a workload-by-workload basis, such that the protections in front of each workload are tailored to the vulnerabilities of that particular workload.

Additionally, when the firewall is far from the workload, it cannot protect against east-west traffic that is carried on within the trusted side of the firewall. Thus, it is desirable to have improved solutions that provide protections closer to the workloads.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
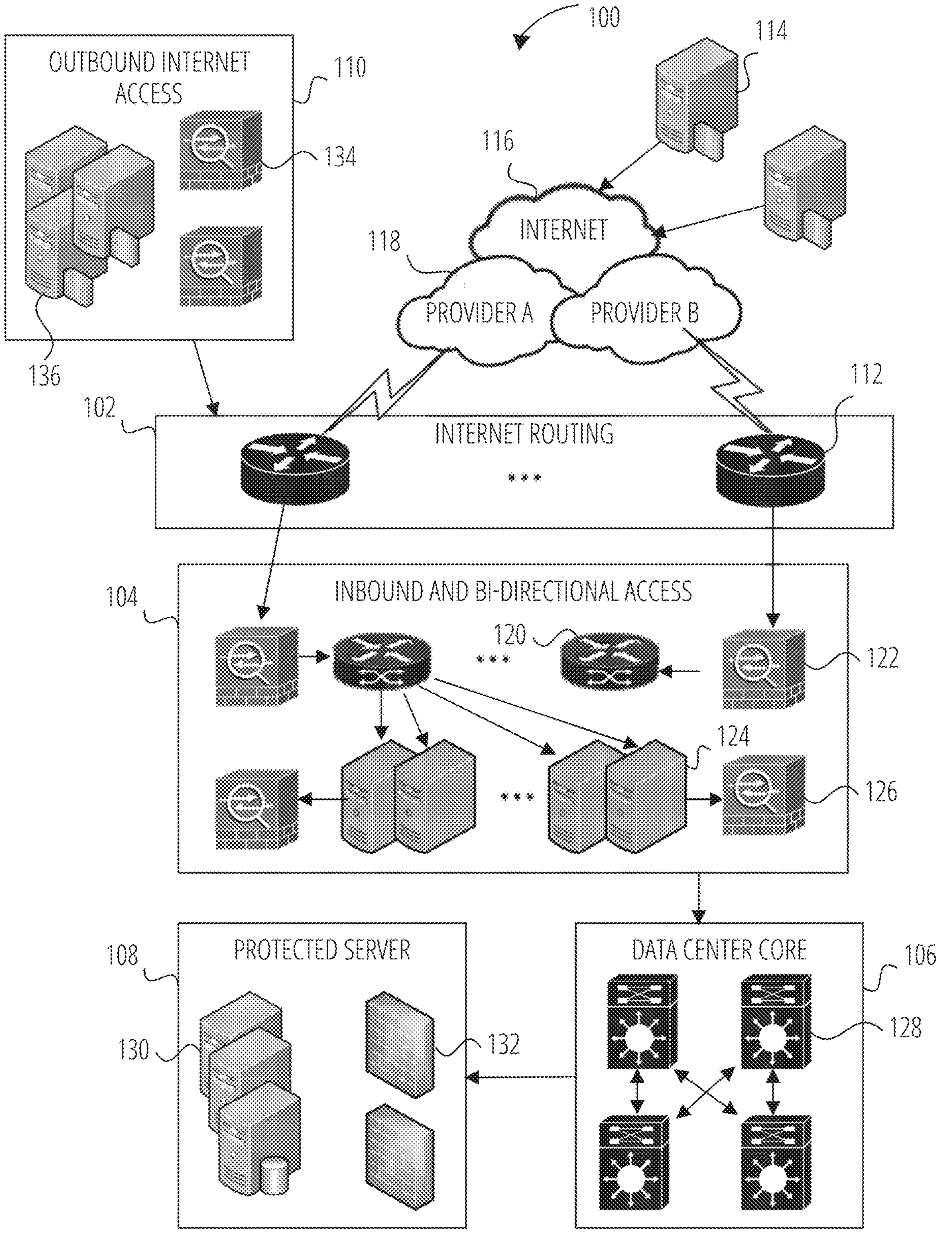
FIG. 1 illustrates a block diagram of an example of an e-commerce network that implements the dynamically programmed compensating controls in network components that are placed in front of respective workloads, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for dynamically placing security controls in a network infrastructure. The method includes ingesting input values that represent a workload in a network architecture, wherein the workload is arranged downstream from a network component such that ingress traffic passes through the network component before reaching the workload; and analyzing the input values to determine one or more security vulnerabilities of the workload. The method further includes, in response to the analysis of the input values, selecting one or more compensating controls; and performing instructions in the network component that implement the one or more compensating controls, wherein the compensating controls comprise a call-stack control or a process invocation control to limit system or workload related actions to prevent an exploit.

In one aspect, a method is provided for dynamically placing security controls in a network infrastructure. The method includes ingesting input values that represent a workload in a network architecture, wherein the workload is arranged downstream from a network component such that ingress traffic passes through the network component before reaching the workload; and analyzing the input values to determine one or more security vulnerabilities of the workload. The method further includes, in response to the analysis of the input values, selecting one or more compensating controls that protect the workload from the one or more security vulnerabilities of the workload; and performing instructions in the network component that implement the one or more compensating controls that are applied to data traffic passing through the network component to the workload.

In another aspect, the method may also include that in the step of performing the instructions in the network component that implement the one or more compensating controls, the network component performing the instructions is a data processing unit (DPU), a Berkley packet filter (BPF), and/or an extended BPF (eBPF) capability.

In another aspect, the method may also include analyzing the input values to determine an asset criticality of the workload and determine; and in response to the analysis of the input values, selecting the one or more compensating controls based on both the asset criticality and the one or more security vulnerabilities of the workload.

In another aspect, the method may also include that the input values comprise one or more vulnerability scores and/or one or more asset criticality scores, the vulnerability scores representing a degree to the workload is at risk of compromise due to predefined vulnerability, and the asset criticality scores representing a degree to which a compromise of the workload would impact a predefined goal.

In another aspect, the method may also include receiving updated input values are updates to the input values that represent the workload; updating, based on the updated input values, the analysis of the input values to determine the one or more security vulnerabilities of the workload; based on the updated analysis, updating the one or more compensating controls that are selected to protect the workload from the one or more security vulnerabilities; and updating the instructions performed in the network component that implement the updated one or more compensating controls.

In another aspect, the method may also include that, when updating the analysis of the input values results in a determination to remove a first security vulnerability from the one or more security vulnerabilities, a compensating control corresponding to the first security vulnerability is removed from the one or more compensating controls that are implemented by the instructions performed in the network component.

In another aspect, the method may also include that the input values include: (i) first information regarding trusted devices and/or trusted users that represents whether sources of the data traffic have indications of being trusted, (ii) second information regarding asset-criticality scoring that represents a degree to which a successful cyber attack of the workload would impact a predefined goal, (iii) third information regarding vulnerability scoring that represents degrees to which the workload is susceptible to respective vulnerabilities, (iv) fourth information regarding one or more threat feeds that represent threat intelligence regarding the respective vulnerabilities, (v) fifth information regarding a software bill of materials (SBOM) that represents a nested inventory of products making up software components running on the workload, and (iv) sixth information regarding a vulnerability exploitability exchange (VEX) that represents attestations indicating whether the products are affected by the vulnerabilities.

In another aspect, the method may also include ingesting other input values that represent another workload in the network architecture, wherein the another workload is arranged downstream from another network component such that other ingress traffic passes through the network component before reaching the workload; analyzing the other input values to determine another one or more security vulnerabilities of the another workload; in response to the analysis of the another input values, selecting another one or more compensating controls that protect the another workload from the another one or more security vulnerabilities of the another workload; and performing another instructions in the another network component that implement the another one or more compensating controls that are applied to data traffic passing through the another network component to the workload, wherein the another one or more compensating controls differ from the one or more compensating controls due to differences between the another workload and the workload.

In another aspect, the method may also include that the network component is directly before the workload such that all data traffic to the workload, including east-west data traffic, passes through the network component before reaching the workload.

In another aspect, the method may also include applying a firewall to the data traffic before the data traffic reaches the network component, the firewall performing one or more firewall functions on the data traffic, and selecting the one or more compensating controls to avoid redundancy with firewall functions performed on the data traffic by the firewall.

In one aspect, a computing apparatus includes a processor. The computing apparatus also includes a memory storing instructions that, when executed by the processor, configure the apparatus to perform the respective steps of any one of the aspects of the above-recited methods.

In one aspect, a computing apparatus includes a processor. The computing apparatus also includes a memory storing instructions that, when executed by the processor, configure the apparatus to ingest input values that represent a workload in a network architecture, wherein the workload is arranged downstream from a network component such that ingress traffic passes through the network component before reaching the workload; analyze the input values to determine one or more security vulnerabilities of the workload; in response to the analysis of the input values, select one or more compensating controls; and perform instructions in the network component that implement the one or more compensating controls, wherein the compensating controls comprise a call-stack control or a process invocation control to limit system or workload related actions to prevent an exploit.

In one aspect, a computing apparatus includes a processor. The computing apparatus also includes a memory storing instructions that, when executed by the processor, configure the apparatus to ingest input values that represent a workload in a network architecture, wherein the workload is arranged downstream from a network component such that ingress traffic passes through the network component before reaching the workload; analyze the input values to determine one or more security vulnerabilities of the workload; in response to the analysis of the input values, select one or more compensating controls that protect the workload from the one or more security vulnerabilities of the workload; and perform instructions in the network component that implement the one or more compensating controls that are applied to data traffic passing through the network component to the workload.

In another aspect of the computing apparatus, the network component that performs the instructions is a data processing unit (DPU), a Berkley packet filter (BPF), and/or an extended BPF (eBPF) capability.

In another aspect of the computing apparatus, the stored instructions, when executed by the processor, further configure the apparatus to analyze the input values to determine an asset criticality of the workload and determine; and in response to the analysis of the input values, select the one or more compensating controls based on both the asset criticality and the one or more security vulnerabilities of the workload.

In another aspect of the computing apparatus, the input values comprise one or more vulnerability scores and/or one or more asset criticality scores, the vulnerability scores representing a degree to the workload is at risk of compromise due to predefined vulnerability, and the asset criticality scores representing a degree to which a compromise of the workload would impact a predefined goal.

In another aspect of the computing apparatus, the stored instructions, when executed by the processor, further configure the apparatus to: receive updated input values are updates to the input values that represent the workload; update, based on the updated input values, the analysis of the input values to determine the one or more security vulnerabilities of the workload, based on the updated analysis, update the one or more compensating controls that are selected to protect the workload from the one or more security vulnerabilities; and update the instructions performed in the network component that implement the updated one or more compensating controls.

In another aspect of the computing apparatus, when updating the analysis of the input values results in a determination to remove a first security vulnerability from the one or more security vulnerabilities, a compensating control corresponding to the first security vulnerability is removed from the one or more compensating controls that are implemented by the instructions performed in the network component.

In another aspect of the computing apparatus, the input values include: (i) first information regarding trusted devices and/or trusted users that represents whether sources of the data traffic have indications of being trusted, (ii) second information regarding asset-criticality scoring that represents a degree to which a successful cyber attack of the workload would impact a predefined goal, (iii) third information regarding vulnerability scoring that represents degrees to which the workload is susceptible to respective vulnerabilities, (iv) fourth information regarding one or more threat feeds that represent threat intelligence regarding the respective vulnerabilities, (v) fifth information regarding a software bill of materials (SBOM) that represents a nested inventory of products making up software components running on the workload, and (iv) sixth information regarding a vulnerability exploitability exchange (VEX) that represents attestations indicating whether the products are affected by the vulnerabilities.

In another aspect of the computing apparatus, the stored instructions, when executed by the processor, further configure the apparatus to: ingest other input values that represent another workload in the network architecture, wherein the another workload is arranged downstream from another network component such that other ingress traffic passes through the network component before reaching the workload; analyze the other input values to determine another one or more security vulnerabilities of the another workload; in response to the analysis of the another input values, select another one or more compensating controls that protect the another workload from the another one or more security vulnerabilities of the another workload; and perform another instructions in the another network component that implement the another one or more compensating controls that are applied to data traffic passing through the another network component to the workload, wherein the another one or more compensating controls differ from the one or more compensating controls due to differences between the another workload and the workload.

In another aspect of the computing apparatus, the network component is directly before the workload such that all data traffic to the workload, including east-west data traffic, passes through the network component before reaching the workload.

In another aspect of the computing apparatus, the stored instructions, when executed by the processor, further configure the apparatus to applying a firewall to the data traffic before the data traffic reaches the network component, the firewall performing one or more firewall functions on the data traffic, and selecting the one or more compensating controls to avoid redundancy with firewall functions performed on the data traffic by the firewall.

Example Embodiments

Additional features and advantages of the disclosure will be set forth in to the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improved cyber threat mitigation solutions that can be deployed more quickly than traditional firewalls to mitigate newly discovered vulnerabilities. Further, the disclosed technology addresses the need in the art for improved solutions that can be more agile in adding and removing protections/rules that are tailored to the particular vulnerabilities of the workload. Additionally, the disclosed technology addresses the need in the art for more efficient solutions that provide more fine-grained protections on a workload-by-workload basis, such that the protections in front of each workload are more closely tailored/customized to the vulnerabilities of that particular workload. Moreover, the disclosed technology addresses the need in the art for cyber security protections located closer to the respective workloads.

According to certain non-limiting examples, the systems and methods disclosed herein can place compensating controls in front of a workload in a network system based on the asset criticality and/or security vulnerabilities of the workload. For example, the workload can be a CPU that is running an application or operating system that has particular vulnerabilities, but this application or operating system is not susceptible to other vulnerabilities. Consider, for example, the Log 4J vulnerability to which the Java logging library and Apache Log 4j are susceptible but native Windows is not susceptible to the Log 4J vulnerability. Based on the particular vulnerabilities of the workload a threat score can be generated to indicate which protections are beneficial and which are not beneficial for that particular workload.

Further, different workloads can have different degrees of asset criticality. At one end of the spectrum, the workload may be used for a core component of an enterprise that is necessary for the continuous operation of the enterprise. At the other end of the spectrum, the workload may be not essential, only used intermittently, and not contain information that would be a significant loss if it were compromised. Based on where the workload falls along this spectrum, an asset-criticality score can be generated for the workload.

Informed by the threat score and the asset-criticality score, appropriate compensating controls can be selected to be placed in front of the workload. For example, if the workload is a Java server, then appropriate compensating controls may include those compensating controls that protect against or filter based on Intrusion Prevention System (IPS) signatures of the Log 4J vulnerability. Further, there may be a graded scale of compensating controls in which one end of the scale includes unobtrusive and computationally minimal controls that provide a lesser degree of protection and the other end of the scale includes highly restrictive, invasive, and/or computationally demanding controls that provide the highest degree of protection. As the asset criticality increases, increased computational resources are justified to ensure more important workloads are better protected.

According to certain non-limiting examples, the systems and methods disclosed herein can ingest input values that include, e.g., one or more threat scores and/or one or more trust scores. The input values can represent a workload in a network architecture. The workload is arranged downstream from a network component/device such that ingress traffic passes through the network component/device before reaching the workload. The input values can be analyzed to determine asset criticality and one or more security vulnerabilities of the workload. In response to the analysis of the input values, one or more compensating controls can be selected based on the determined asset criticality and one or more security vulnerabilities of the workload. The network component/device that is upstream from the workload can be, e.g., a data processing unit (DPU) or an extended Berkley packet filter (eBPF) capability.

According to certain non-limiting examples, the systems and methods disclosed herein provide dynamic placement of compensating controls based on threat and trust score analysis. the systems and methods disclosed herein can ingest, as inputs, various threat feeds and trust scoring. Examples of such inputs (e.g., threat feeds and trust scoring) can include, e.g., inputs from (i) DUO trusted devices and users; (ii) KENNA asset criticality scoring; (iii) KENNA vulnerability scoring; (iv) SOFTWARE BILL OF MATERIALS (SBOM) SYSTEMS; (v) thread feeds from TALOS; and (vi) thread feeds from MANDIENT. The inputs are not limited to those listed above.

Next, based on the threat scoring, compensating controls can be selected and placed in network components (e.g., DPUs and/or eBPFs) that are located in front of the workload. Because data traffic flows pass through network components along its network path to the workload, the compensating controls can mitigate the risks for particular vulnerabilities that, based on the inputs, have been identified as relevant to the specific workload. For example, if the vulnerability scoring indicates that a workload is vulnerable to Log 4J, then the system can apply a compensating control in a DPU that filters data packets based on IPS signatures of the Log 4J vulnerability. Further, the DPU can be programmatically deployed in front of the workload (e.g. using a dynamically programmed overlay) with a Log 4j signature deployed. Additionally, adjacency compensating controls can also be installed in the DPU that are directed to address similar or closely related attacks on the workload. For example, a Log 4J vulnerability might also mean another Apache vulnerability may also be present—even if not detected.

In addition, according to certain non-limiting examples, the compensating controls can include capabilities on the host that are not network related compensating controls. For example, the compensating controls can be another type of control, such as a call-stack control or a process invocation control to limit system or workload related actions to prevent an exploit.

FIG. 1 illustrates a block diagram of one non-limiting example of an internet edge security framework 100 the includes internet routing 102, inbound and bi-directional access 104, a data center core 106, a back-end protected server 108, and outbound internet access 110. The internet edge security framework 100 can exemplify several aspects of security principles that are applicable for cloud computing, such as in secure web and/or e-commerce design.

According to certain non-limiting examples, the proxy server 114 can be a global web cache proxy server that provides enhanced website response to clients within the world wide web (WWW) and provides additional distributed denial of service (DoS) protection and flooding protection. Traffic from the proxy server 114 is conducted through the internet 116 via one or more providers 118. The internet routing 102 can be provided by one or more routers 112, which can be multi-homed border gateway protocol (BGP) internet routers that can include RFC 1918 and RFC 330 address filtering and RFC 2827 and RFC 3704 best practice methods. Further, internet routing 102 can provide border gateway protocol (BGP) transit autonomous system AS prevention mechanisms such as AS filtering, no-export community value and RFC 4272 best practices. RFC refers to a Request for Comments technical note or publication, which is a publication in a series from the principal technical development and standards-setting bodies for the Internet, most prominently the Internet Engineering Task Force (IETF).

According to certain non-limiting examples, inbound and bi-directional access 104 can be an external demilitarized zone (DMZ) that provides, e.g., external firewalls (e.g., ingress firewall 122) and/or intrusion prevention system (IPS). For example, inbound and bi-directional access 104 can provide protection to public Internet Protocol (IP) addressed dedicated, internally un-routable address spaces for communications to load balancers and server untrusted interfaces. The inbound and bi-directional access 104 can be tuned to provide additional transmission control protocol (TCP) synchronize message (SYN) flooding and other DoS protection. In addition to providing reconnaissance scanning mitigation, the IPS service modules (e.g., provided by the load balancer 120) can protect against man-in-the-middle and injection attacks.

The load balancers 120 can provide enhanced application layer security and resiliency services in terminating HTTPS traffic (e.g., HTTPS traffic on port 443) and communicating with front-end web servers 124 on behalf of external clients. For example, external clients do not initiate a direct TCP session with the front-end web servers 124. According to certain non-limiting examples, only the front-end web servers 124 receive requests on untrusted interfaces, and the front-end web servers 124 only make requests to the back-end servers 130 on trusted interfaces The protected server 108 is protected by the back-end firewall 132 and IPS to provide granular security access to back-end databases. The protected server 108 protects against unauthorized access and logs blocked attempts for access.

According to certain non-limiting examples, the internet edge security framework 100 provides defense in depth. Further, internet edge security framework 100 can advantageously use a dual-NIC (network interface controller) configured according to a trusted/un-trusted network model as a complement to a layered defense in depth approach.

According to certain non-limiting examples, the internet edge security framework 100 can include a DMZ environment (e.g., inbound and bi-directional access 104), which can be thought of as the un-trusted side of the infrastructure. The front-end web servers 124 can have a network interface controller (NIC), which includes the ingress firewall 122 and through which requests are received from outside of the internet edge security framework 100. Additionally, servers can be configured with a second NIC (e.g., egress firewall 126) and can connect to a trusted network (e.g., protected server 108) that is configured with an internal RFC 1918 address. According to certain non-limiting examples, firewall services can be provided for protected server 108, which is an area of higher trust. Front-end web servers 124 can make back-end requests on the egress firewall 126. According to certain non-limiting examples, front-end web servers 124 can limit receiving requests to the un-trusted NIC, and front-end web servers 124 can limit making requests to the trusted NIC.

According to certain non-limiting examples, an additional layer of protection can be added by placing a load balancer (e.g., load balancer 120) in front of the front-end web servers 124. For example, the load balancers 120 can terminate TCP sessions originating from hosts on the internet. Further, the load balancers 120 can act as proxies, and initiate another session to the appropriate virtual IP (VIP) pool members, thereby advantageously providing scalability, efficiency, flexibility, and security.

Further regarding internet routing 102, the edge router 112 can provide IP filtering. For example, firewalls can be integrated with the routers 112. These firewalls can filter out traffic and reduce the footprint of exposure. For example, router 112 can be used to filter RFC 1918 and 3330 addresses. Further, the router 112 and/or ingress firewall 122 can be used to perform ingress filtering (e.g., RFC 2827 and RFC 3704) to cover multi-homed networks. Additionally or alternatively, the router 112 can provide some basic spoofing protection, e.g., by straight blocking large chunks of IP space that are not used as source addresses on the internet. Depending on its capacity, the router 112 can be used to provide some additional filtering to block, e.g., blacklisted IP blocks such as those defined in RFC 5782. Additionally or alternatively, router 112 can provide protection against BGP attacks, as discussed, e.g., in RFC 4272 and discussed in http://www.cisco.com/web/about/security/intelligence/protecting_bgp.html, which is hereby incorporated by reference in its entirety.

In addition to using dual NICs, the internet edge security framework 100 further illustrates using two separate environments on two different firewall pairs and/or clusters (e.g., a front-end environment such as the inbound and bi-directional access 104 and a back-end environment such as the protected server 108. According to certain non-limiting examples, the internet edge security framework 100 can use a simplified architecture with a high availability (HA) firewall pair for the front end and a separate HA firewall pair for the back end. The back-end environment can include the databases and any other sensitive file servers.

For example, inbound web requests can have the following structure: End host sources secure SSL session=>(Internet Cloud)=>Edge Routers=>Edge Firewall un-trusted DMZ=>(optional) Load Balancer=>Un-trusted web server NIC=/=Trusted web server NIC initiates a database fetch to the back end server=>Edge firewall trusted DMZ (RFC 1918)=>Data center network core=>Back-End firewall=>High security database DMZ server.

Regarding outbound internet access 110, the internet edge security framework 100 can use a web proxy solution to provide internet access for internal clients. The outbound proxy servers 136 can provide web filtering mechanisms, internet access policy enforcement and most provide some flavor of data loss prevention, SSL offloading, activity logging, and audit capabilities, for example. In the reverse fashion from the inbound connectivity module, proxy servers can receive requests on trusted interfaces and can make requests on un-trusted interfaces.

Figure 2A:
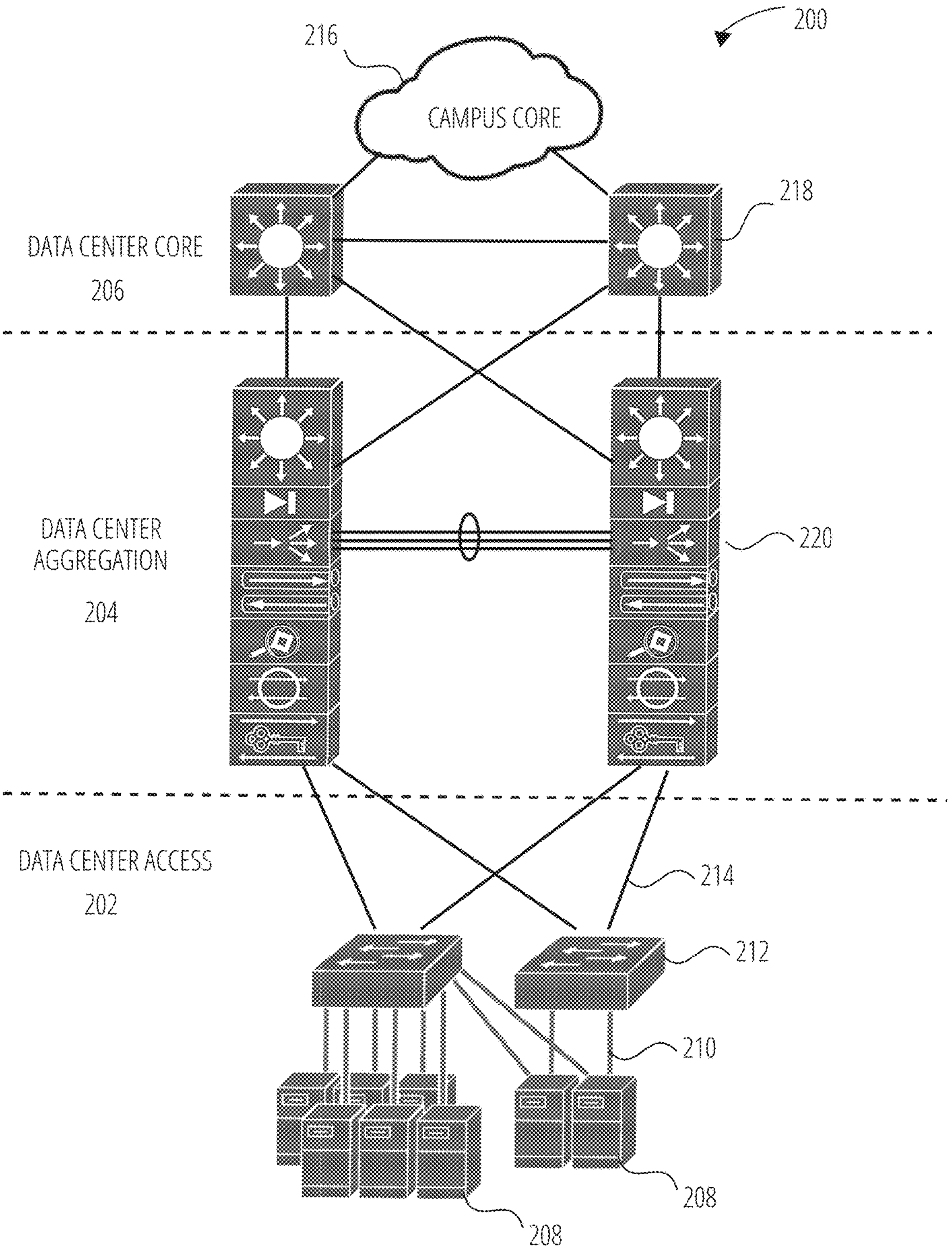
FIG. 2A illustrates a block diagram of an example of a network having an access cluster in the access layer, in accordance with some embodiments.

FIG. 2A illustrates a first non-limiting example of a multi-tier data center 200, which includes data center access 202, data center aggregation 204, and data center core 206. The data center 200 provides computational power, storage, and applications that can support an enterprise business, for example.

The network design of the data center 200 can be based on a layered approach. The layered approach can provide improved scalability, performance, flexibility, resiliency, and maintenance. As shown in FIG. 2A, the layers of the data center 200 can include the core, aggregation, and access layers (i.e., data center core 206, data center aggregation 204, and data center access 202).

The data center core 206 layer provides the high-speed packet switching backplane for all flows going in and out of the data center 200. The data center core 206 can provide connectivity to multiple aggregation modules and provides a resilient Layer 3 routed fabric with no single point of failure. The data center core 206 can run an interior routing protocol, such as Open Shortest Path First (OSPF) or Enhanced Interior Gateway Routing Protocol (EIGRP), and load balances traffic between the campus core and aggregation layers using forwarding-based hashing algorithms, for example.

The data center aggregation 204 layer can provide functions such as service module integration, Layer 2 domain definitions, spanning tree processing, and default gateway redundancy. Server-to-server multi-tier traffic can flow through the aggregation layer and can use services, such as firewall and server load balancing, to optimize and secure applications. The smaller icons within the aggregation layer switch in FIG. 2A represents the integrated service modules. These modules provide services, such as content switching, firewall, SSL offload, intrusion detection, network analysis, and more.

The data center access 202 layer is where the servers physically attach to the network. The server components can be, e.g., 1RU servers, blade servers with integral switches, blade servers with pass-through cabling (illustrated in FIG. 2B), clustered servers (illustrated in FIG. 2A), and mainframes with OSA adapters (illustrated in FIG. 2D). The access layer network infrastructure can include modular switches, fixed configuration 1 or 2RU switches, and integral blade server switches. Switches provide both Layer 2 and Layer 3 topologies, fulfilling the various server broadcast domain or administrative requirements.

The architecture in FIG. 2A is an example of a multi-tier data center, but server cluster data centers can also be used. The multi-tier approach can include web, application, and database tiers of servers. The multi-tier model can use software that runs as separate processes on the same machine using interprocess communication (IPC), or the multi-tier model can use software that runs on different machines with communications over the network. Typically, the following three tiers are used: (i) Web-server; (ii) Application; and (iii) Database. Further, multi-tier server farms built with processes running on separate machines can provide improved resiliency and security. Resiliency is improved because a server can be taken out of service while the same function is still provided by another server belonging to the same application tier. Security is improved. For example, an attacker can compromise a web server without gaining access to the application or database servers. Web and application servers can coexist on a common physical server, but the database typically remains separate. Load balancing the network traffic among the tiers can provide resiliency, and security is achieved by placing firewalls between the tiers. Additionally, segregation between the tiers can be achieved by deploying a separate infrastructure composed of aggregation and access switches, or by using virtual local area networks (VLANs). Further, physical segregation can improve performance because each tier of servers is connected to dedicated hardware. The advantage of using logical segregation with VLANs is the reduced complexity of the server farm. The choice of physical segregation or logical segregation depends on your specific network performance requirements and traffic patterns.

The data center access 202 includes one or more access server clusters 208, which can include layer 2 access with clustering and NIC teaming. The access server clusters 208 can be connected via gigabit ethernet (GigE) connections 210 to the workgroup switches 212. The access layer provides the physical level attachment to the server resources and operates in Layer 2 or Layer 3 modes for meeting particular server requirements such as NIC teaming, clustering, and broadcast containment.

The data center aggregation 204 can include aggregation processor 220, which is connected via 10 gigabit ethernet (10 GigE) connections 214 to the data center access 202 layer.

The aggregation layer can be responsible for aggregating the thousands of sessions leaving and entering the data center. The aggregation switches can support, e.g., many 10 GigE and GigE interconnects while providing a high-speed switching fabric with a high forwarding rate. The aggregation processor 220 can provide value-added services, such as server load balancing, firewalling, and SSL offloading to the servers across the access layer switches. The switches of the aggregation processor 220 can carry the workload of spanning tree processing and default gateway redundancy protocol processing.

For an enterprise data center, the data center aggregation 204 can contain at least one data center aggregation module that includes two switches (i.e., aggregation processors 220). The aggregation switch pairs work together to provide redundancy and to maintain the session state. For example, the platforms for the aggregation layer include the CISCO CATALYST 6509 and CISCO CATALYST 6513 switches equipped with SUP720 processor modules. The high switching rate, large switch fabric, and ability to support a large number of 10 GigE ports are important requirements in the aggregation layer. The aggregation processors 220 can also support security and application devices and services, including, e.g.: (i) Cisco Firewall Services Modules (FWSM); (ii) Cisco Application Control Engine (ACE); (iii) Intrusion Detection; (iv) Network Analysis Module (NAM); and (v) Distributed denial-of-service attack protection.

The data center core 106 provides a fabric for high-speed packet switching between multiple aggregation modules. This layer serves as the gateway to the campus core 216 where other modules connect, including, for example, the extranet, wide area network (WAN), and internet edge. Links connecting the data center core 206 can be terminated at Layer 3 and use 10 GigE interfaces to support a high level of throughput, performance, and to meet oversubscription levels. According to certain non-limiting examples, the data center core 206 is distinct from the campus core 216 layer, with different purposes and responsibilities. A data center core is not necessarily required, but is recommended when multiple aggregation modules are used for scalability. Even when a small number of aggregation modules are used, it might be appropriate to use the campus core for connecting the data center fabric.

The data center core 106 layer can connect, e.g., to the campus core 216 and data center aggregation 204 layers using Layer 3-terminated 10 GigE links. Layer 3 links can be used to achieve bandwidth scalability, quick convergence, and to avoid path blocking or the risk of uncontrollable broadcast issues related to extending Layer 2 domains.

The traffic flow in the core can include sessions traveling between the campus core 216 and the aggregation processors 220. The data center core 206 aggregates the aggregation module traffic flows onto optimal paths to the campus core 216. Server-to-server traffic can remain within an aggregation processor 220, but backup and replication traffic can travel between aggregation processors 220 by way of the data center core 206.

Figure 2B:
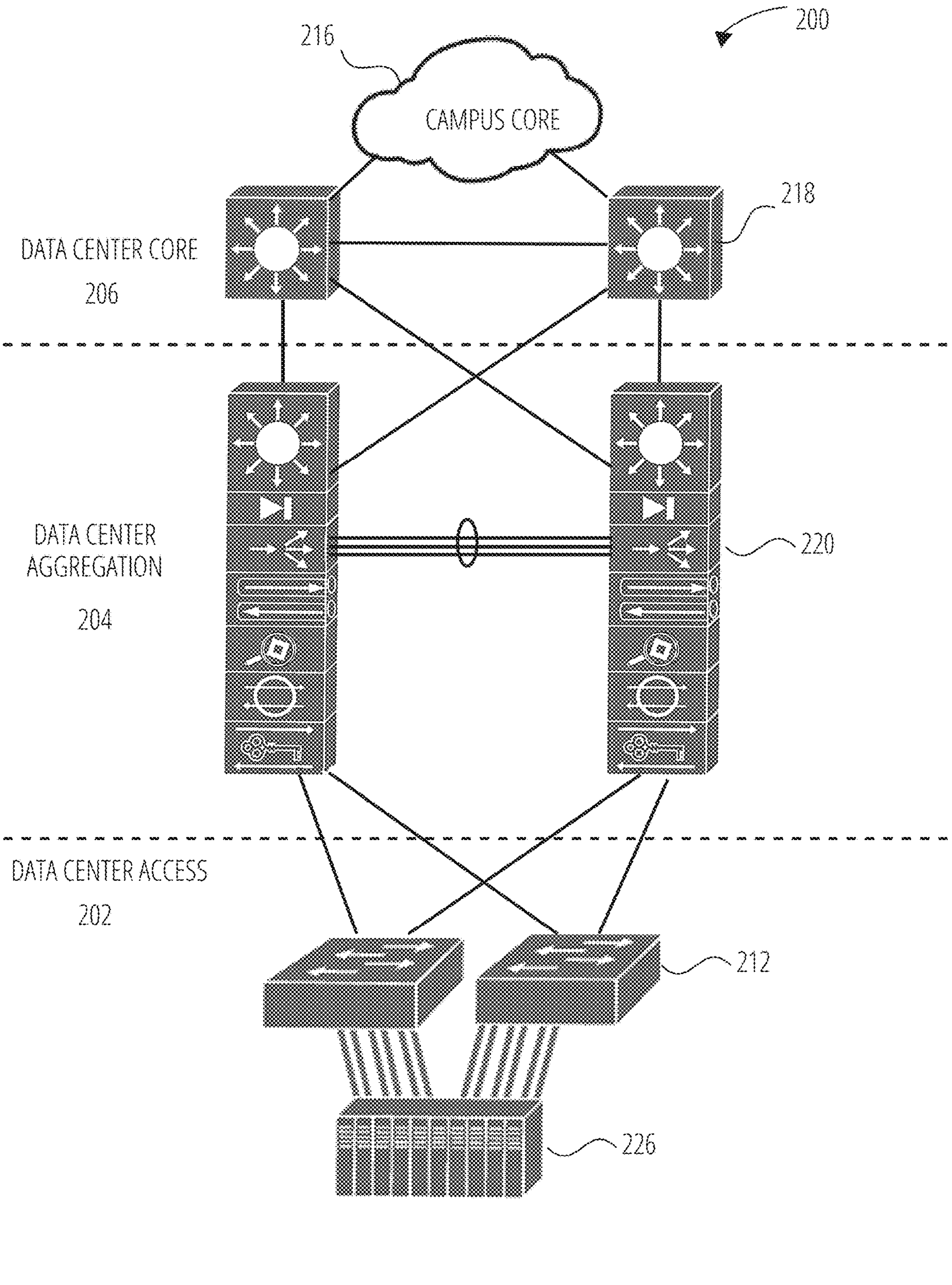
FIG. 2B illustrates a block diagram of an example of a network having a blade chassis in the access layer, in accordance with some embodiments.

FIG. 2B illustrates a data center 200 in which the data center aggregation 204 and the data center core 206 are the same as in FIG. 2A. In FIG. 2B, the data center access 202 includes a blade chassis 226 with pass thru modules connected to the workgroup switches 212.

Figure 2C:
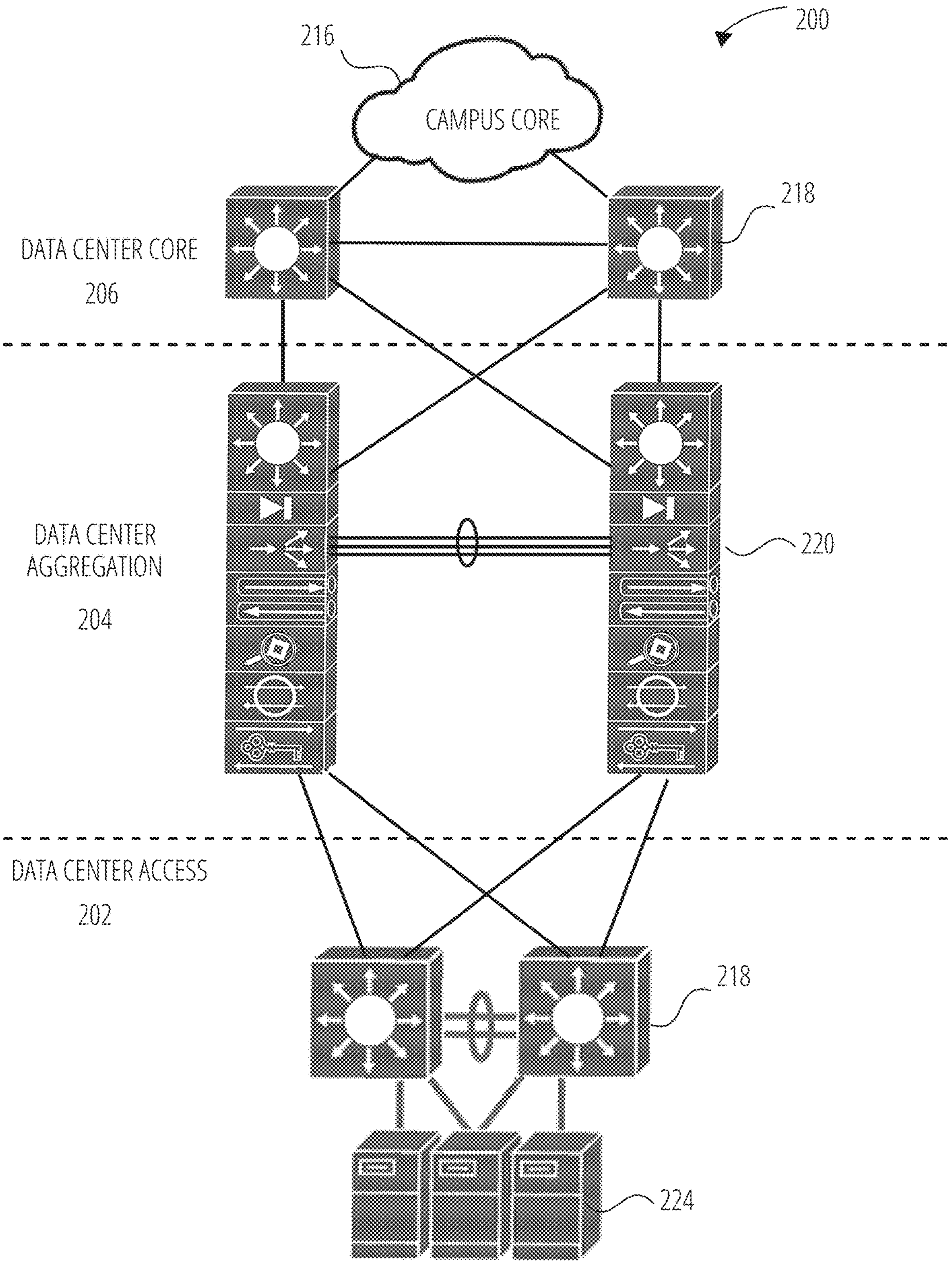
FIG. 2C illustrates a block diagram of an example of a network having isolated servers in the access layer, in accordance with some embodiments.

FIG. 2C illustrates a data center 200 in which the data center aggregation 204 and the data center core 206 are the same as in FIG. 2A. In FIG. 2C, the data center access 202 includes isolated servers 224 that are connected to multilayer switches 218, providing layer 3 access with small broadcast domains and isolated servers.

Figure 2D:
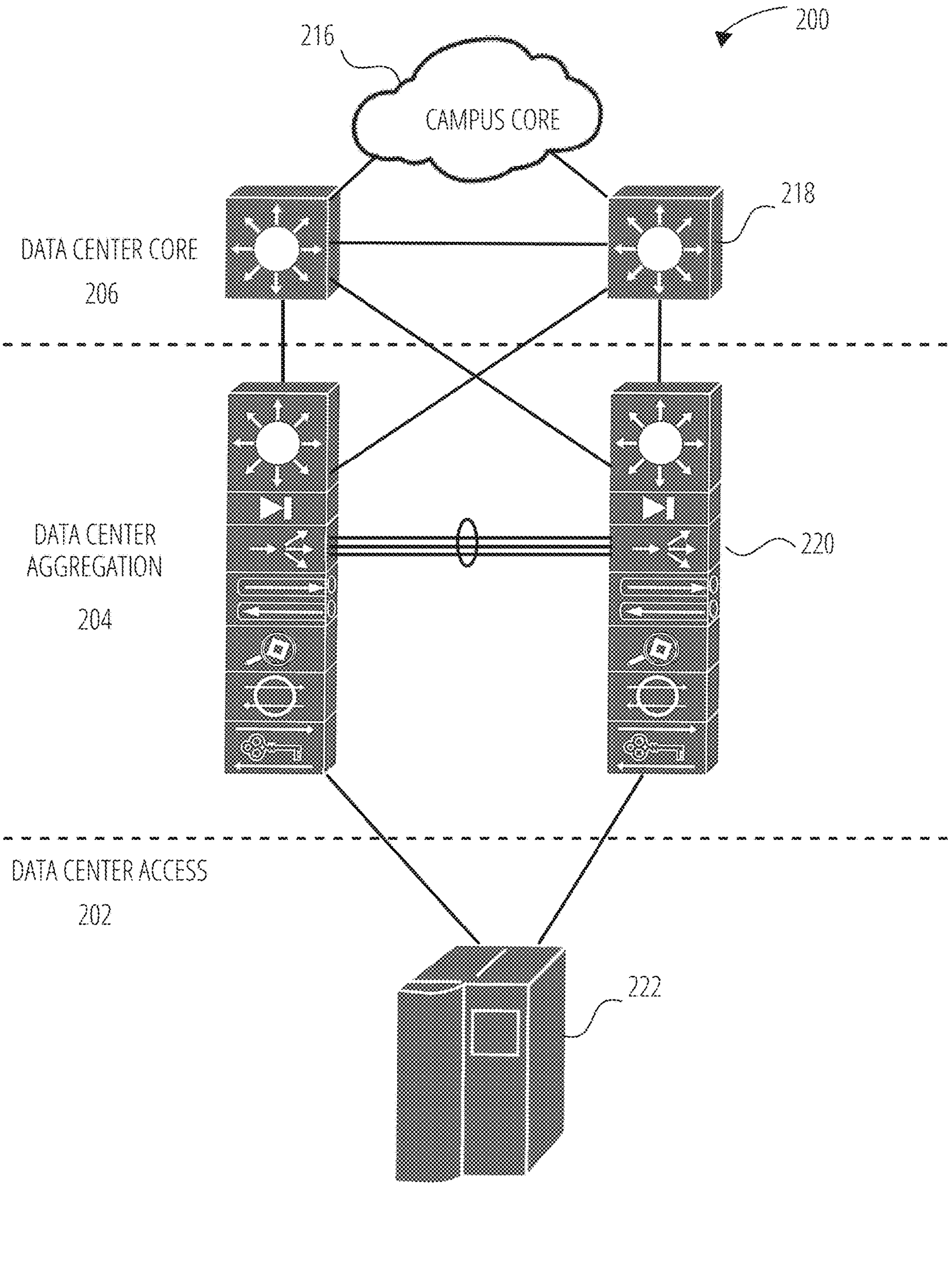
FIG. 2D illustrates a block diagram of an example of a network having a main frame in the access layer, in accordance with some embodiments.
Figure 2E:
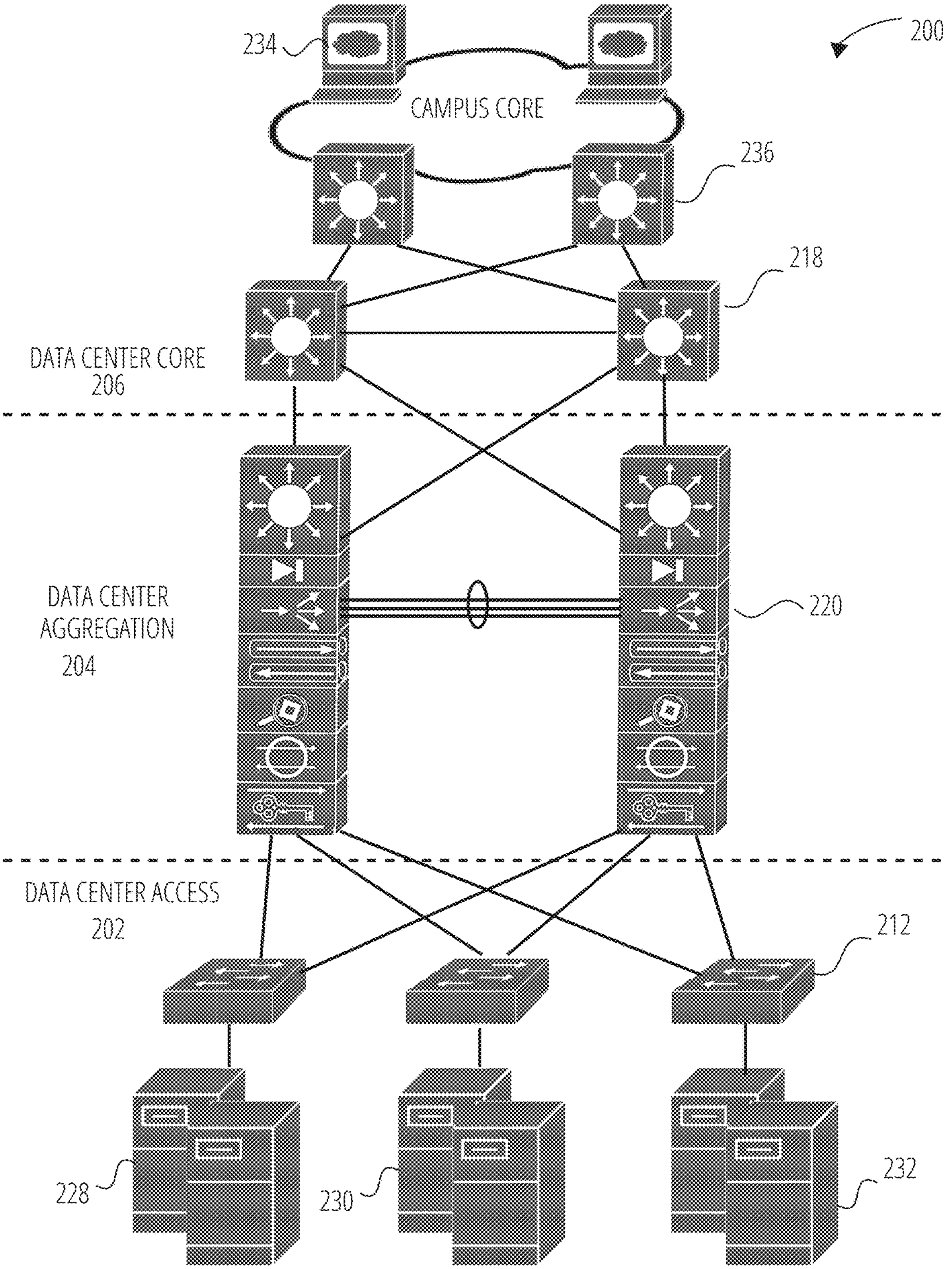
FIG. 2E illustrates a block diagram of an example of a network having respective servers (e.g., a web server, an application server, and a database server) in the access layer, in accordance with some embodiments.

FIG. 2D illustrates a data center 200 in which the data center aggregation 204 and the data center core 206 are the same as in FIG. 2A. In FIG. 2D, the data center access 202 includes the mainframe 222 with OSA that is connected to multilayer switches 218.

FIG. 2D illustrates other aspects of the data center 200. The connections among the multilayer switches 218 and the other multilayer switches 236 enable traffic flow in the data center core to the clients 234 in the campus core 216. The data center core 206 can connect to the campus core 216 and data center aggregation 204 layer using Layer 3-terminated 10 GigE links. Layer 3 links can be used to achieve bandwidth scalability, quick convergence, and to avoid path blocking or the risk of uncontrollable broadcast issues related to extending Layer 2 domains.

According to certain non-limiting examples, the traffic flow in the core consists primarily of sessions traveling between the campus core and the aggregation modules. The core aggregates the aggregation module traffic flows onto optimal paths to the campus core.

The traffic in the data center aggregation 204 layer primarily can include core layer to access layer flows. The core-to-access traffic flows can be associated with client HTTP-based requests to the web servers 228, the application servers 230, and the database servers 232. At least two equal cost routes exist to the web server subnets. The CISCO Express Forwarding (CEF)-based L3 plus L4 hashing algorithm determines how sessions balance across the equal cost paths. The web sessions might initially be directed to a VIP address that resides on a load balancer in the aggregation layer, or sent directly to the server farm. After the client request goes through the load balancer, it might then be directed to an SSL offload module or a transparent firewall before continuing to the actual server residing in the data center access 202.

Figure 3:
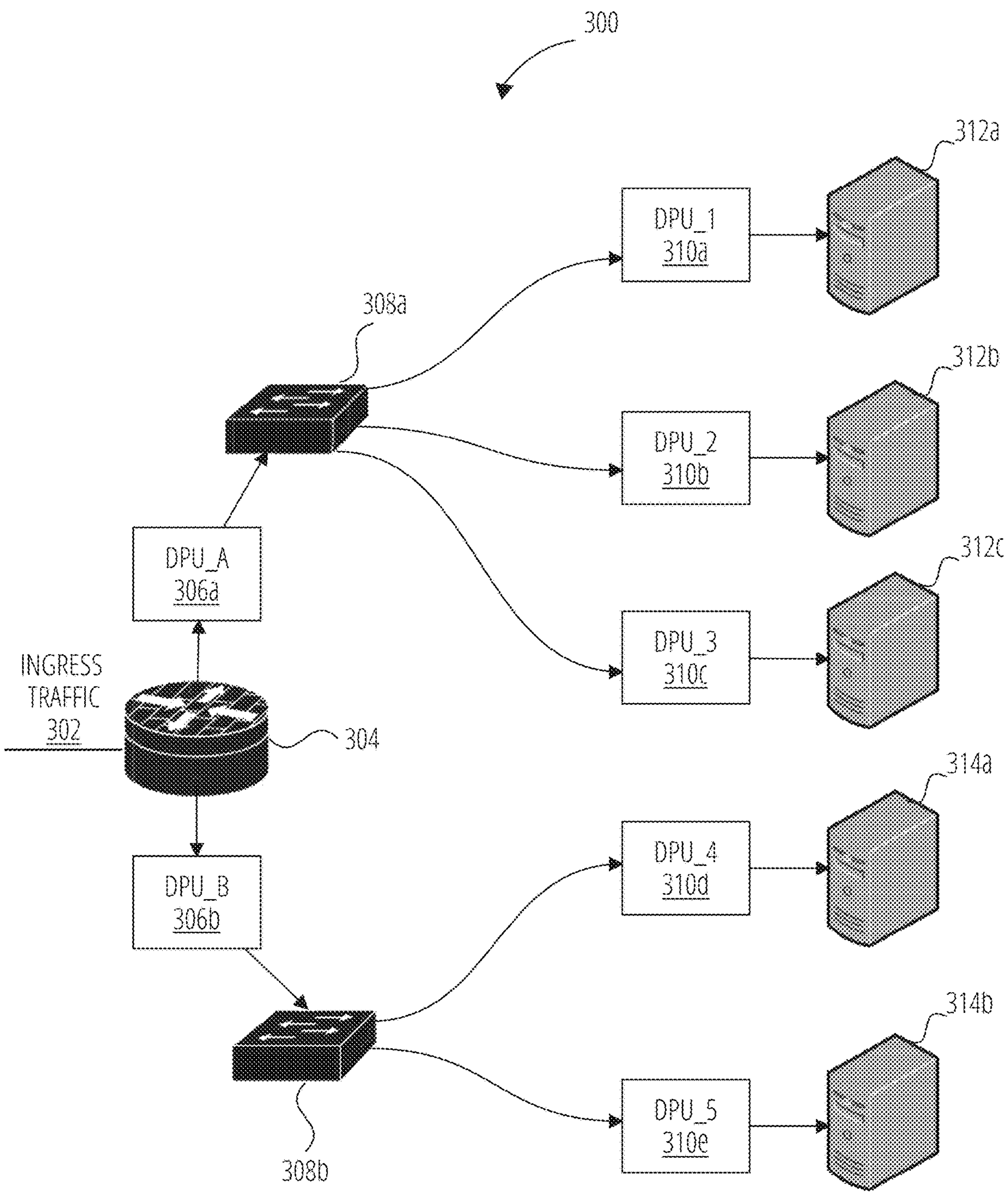
FIG. 3 illustrates a block diagram of an example of a subsystem of a network that includes data processing units (DPUs) that perform various network component functions, in accordance with some embodiments.

FIG. 3 illustrates a subsystem 300, which is an example of a portion of a network system (e.g., a data center 200 or an e-commerce platform 100). Subsystem 500 provides an example of how compensating controls can be dynamically placed before respective workloads. Subsystem 300 includes ingress traffic 302 that flows into a router 304 that includes a firewall. A first part of the traffic is directed to switch_1 308*a* and passes through DPU_A 306*a* on the way to switch_1 308*a*. The first part of the traffic is then further subdivided into three streams that are relayed to workload_1 312*a*, workload_2 312*b*, and workload_3 312*c*, and these three streams respectively pass through DPU_1 310*a*, DPU_2 310*b*, and DPU_3 310*c* on the way to workload_1 312*a*, workload_2 312*b*, and workload_3 312*c*.

A second part of the traffic is directed to switch_2 308*b* and passes through DPU_B 306*b* on the way to switch_2 308*b*. The second part of the traffic is then further subdivided into two streams that are relayed to workload_4 314*a* and workload_5 314*b* by way of DPU_4 310*d* and DPU_5 310*e*, respectively.

Each of the workloads can be different (e.g., executing different applications with different susceptibilities to being exploited by cyber attacks) or can be the same. For example, if workload_1 312*a*, workload_2 312*b*, and workload_3 312*c* are part of a cluster of workloads that are all executing the same applications, then the compensating controls might be placed in DPU_A 306*a* such that all traffic to workload_1 312*a*, workload_2 312*b*, and workload_3 312*c* passes through the compensating controls. Alternatively, when the compensating controls are directed to an application that is only being executed on workload_1 312*a* and not on workload_2 312*b*, and workload_3 312*c*, then it is more computationally efficient to place the compensating controls for workload_1 312*a* in DPU_1 310*a* to limit the application of the compensating controls to those that are relevant for that workload.

Further, if the initial values of the inputs (e.g., the threat scoring) do not distinguish which workloads are susceptible, then, out of an abundance of caution, the compensating controls can be placed in front of all the workloads. For example, the compensating controls can be placed either in DPU_A 306*a* and DPU_B 306*b* or DPU_1 310*a*, DPU_2 310*b*, DPU_3 310*c*, DPU_4 310*d*, and DPU_5 310*e*. Then, as the inputs are updated to indicate that some of the workloads are not susceptible and therefore do not require compensating controls, the compensating controls can be removed from those DPUs in front of those workloads that are not susceptible.

Additionally, the firewall in router 304 can provide certain protections against exploits of the vulnerabilities. When a new vulnerability is discovered, a new patch can be deployed to protect against the newly discovered vulnerability. The time to develop, test, and eventually deploy the new patch can, however, be significant. Accordingly, a more agile response to the newly discovered vulnerability would be beneficial. And the compensating controls provide such an agile response because the compensating controls can be deployed much more quickly than a patch to a firewall. That is, in the interim while the patch has not yet been deployed, compensating controls can be dynamically placed in front of the workloads using the DPUs (e.g., dynamically programmed overlay). Then, after the upgrades/patches have been deployed in the firewall or the vulnerable software, the compensating controls can be removed from the DPUs. Alternatively, if the compensating controls are performing well at preventing cyber attacks, then a patch to the firewall might not be necessary and can be avoided. Further, a cost-benefit analysis can be performed for each particular system/network regarding which strategy (e.g., firewall in the router 304 versus compensating controls in the DPUs) provides the better/proportionate solution with respect protecting against cyber attacks, efficiently allocating computational resources required, and minimizing disruptions to the user's experience of the network.

As would be understood by a person of ordinary skill in the art, subsystem 300 provides a great deal of flexibility with respect to how the compensating controls can be placed/configured among the DPUs (or eBPFs) to tailor the solution to a particular configuration of workloads (e.g., different workloads executing the same or different applications) and different cyber security vulnerabilities. That is, the above examples are non-limiting with respect to the scenarios of workload configurations and the compensating-control solutions tailored to those workload configurations. Further, compensating controls can be applied to address issues with east-west traffic, as would be understood by a person of ordinary skill in the art. Additionally, compensating controls can be placed in either a DPU or in an eBPF, depending on the relative merits and efficiencies of the respective options.

Figure 4:
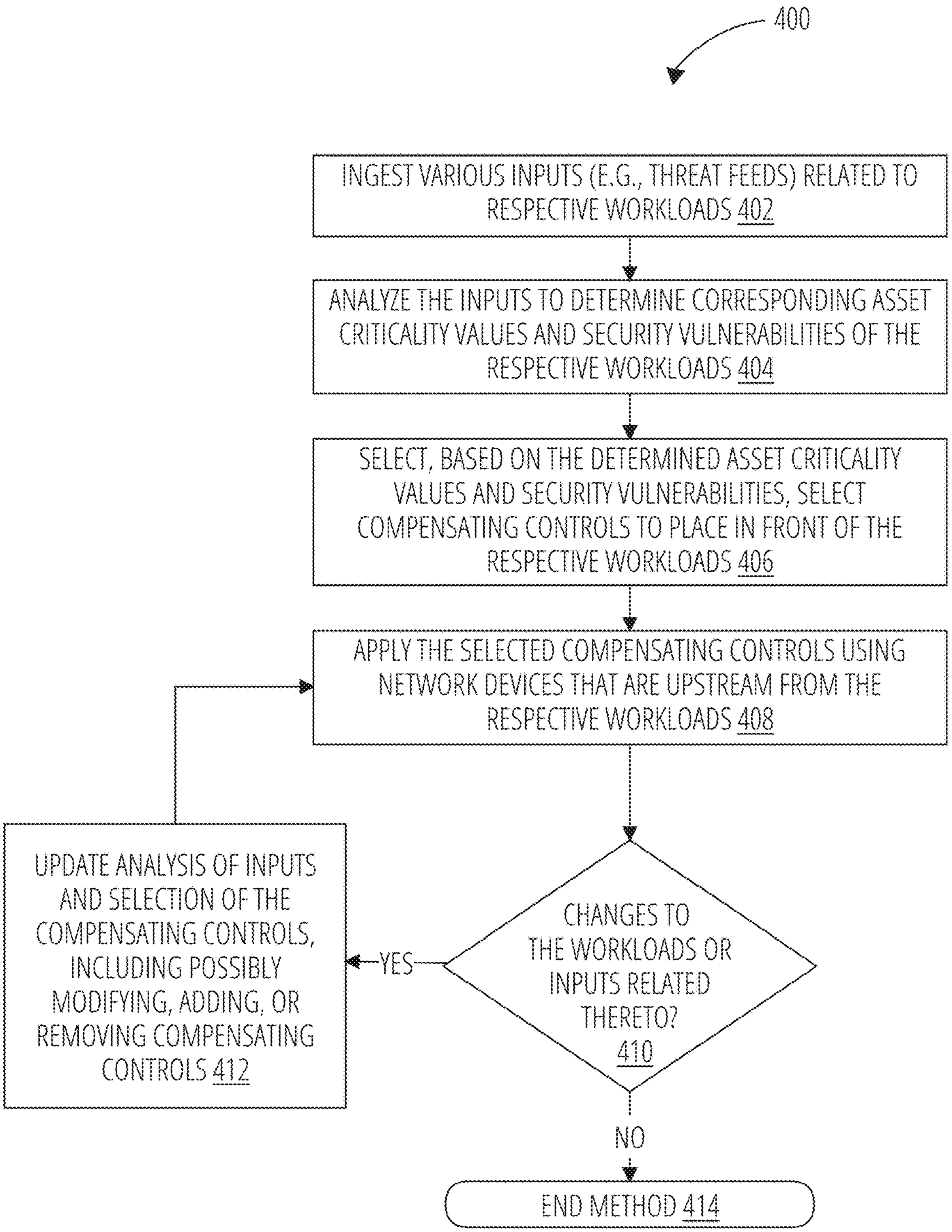
FIG. 4 illustrates an example of the method for dynamically placing compensating controls (e.g., firewall functions and security controls) in DPUs and/or extended Berkley packet filters (eBPF) in a network infrastructure, in accordance with some embodiments.

FIG. 4 illustrates an example routine for a method 400 for dynamic placement of compensating controls on DPU and eBPF based on inputs representing a workload, such as trust and threat scoring. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

According to some examples, step 402 includes ingesting various inputs (e.g., threat feeds) related to respective workloads. The inputs can include, e.g., information can values corresponding to: (i) DUO Trusted Device/User; (ii)

KENNA Asset Criticality Scoring; (iii) KENNA Vulnerability Scoring; (iv) SBOM systems; and (v) Thread Feeds (e.g., TALOS or MANDIENT).

According to some examples, in step 404, the inputs are analyzed to determine corresponding asset criticality values and security vulnerabilities of the respective workloads.

According to some examples, in step 406, compensating controls are selected based on the determined asset-criticality values and security vulnerabilities. The selected compensating controls are placed in front of the respective workloads to mitigate the risks indicated by the determined security vulnerabilities. The risks can include which types of vulnerabilities the workload is susceptible to, the likelihood of those types of vulnerabilities being exploited, and the consequences/impact if they are exploited. The risks indicated by the determined asset criticality values and security vulnerabilities provide guidance on which compensating controls are relevant and appropriate to respective workloads, and, when there are degrees of protection provided by certain compensating controls, which of the degrees of protection is appropriate or proportionate. For example, a set of 10 signatures may be sufficient to detect 90% of all instances of a certain type of vulnerability to which the workload is susceptible, but a set of 100 signatures may improve protection by detecting 99% of the instances of the certain type of vulnerability. Screening/filtering the data flow for the set of 100 signatures can require significantly more computational resources than for the set of 10 signatures. Thus, a compensating control screening for the 10 signatures can be appropriate for workloads with moderate asset-criticality values, whereas another compensating control screening for the 100 signatures can be appropriate for workloads with high asset-criticality values.

According to some examples, in step 408, the selected compensating controls are applied to a data flow by modifying one or more network devices that are upstream from the respective workloads to perform instructions that execute the compensating controls. For example, using a dynamically programmed overlay, a DPU that is in front of the workload can be programmatically deployed with an IPS signature of a determined security vulnerability.

According to some examples, decision step 410 performs an inquiry with respect to whether there have been any changes to the workloads or changes in the inputs representing the workload.

For example, the initial inputs regarding the workload can indicate that the workload uses a given operating system (OS) but the inputs lack information regarding which applications are running on the workload. In this case, the compensating controls placed in front of the workload can account for all possible applications that can run on the given OS. Later, the updated inputs can include additional information that certain applications are not running on the workload, and the compensating controls for those certain applications can be removed. This removal of the compensating controls for those certain applications can be accomplished by signaling a change in the inputs at decision step 410, which would be followed by an updated analysis in step 412 and applying the updated analysis in step 408. If the certain applications were later added to the workload, then the compensating controls for those certain applications can be added again by signaling a change in the inputs at decision step 410, which would be followed by an updated analysis in step 412 and applying the updated analysis in step 408.

As discussed with reference to FIG. 4, updates to the inputs can include additional information regarding: (i) the workloads (e.g., what OS or applications are being executed and any changes thereto); (ii) upstream firewalls, compensating controls, or other cyber security protective actions and any changes thereto; (iii) asset criticality and any changes thereto; and (iv) threat feeds and/or threat intelligence and any changes thereto.

According to some examples, at step 412, method 400 includes updating the analysis of the inputs and updating the selection of the compensating controls based on the updated inputs and/or updated workloads. These updates can include, e.g., modifying, adding, or removing compensating controls.

As discussed with reference to FIG. 4, there may be several network components (e.g., DPUs and eBPFs) at different locations throughout the network. And these network components can be in front of a single workload or multiple workloads. Depending on which workloads are susceptible to the particular cyber attacks against which the compensating controls protect, the change in step 412 can be to remove the compensating controls from one network component and add it to another network component to change which workloads are being protected. Also, the change in step 412 can be to add or remove the compensating controls to a particular DPU based on upstream changes (e.g., adding a patch to a firewall) to process the traffic.

According to some examples, when there are no changes in decision step 410, then method 400 can end at step 414.

According to certain non-limiting examples, method 400 includes generating threat scores based on telemetry data and threat feeds, which can include, e.g., information from (i) trusted device/User; (ii) asset criticality scoring; (iii) vulnerability scoring; (iv) SBOM systems; and (v) thread feeds from various cyber security entities. SBOM (software bill of materials) is a nested inventory that lists ingredients making up software components. Additionally, the SBOM can be used with a Vulnerability Exploitability eXchange (VEX) to determine which vulnerabilities the software components have. A VEX document is an attestation, a form of a security advisory that indicates whether a product or products are affected by a known vulnerability or vulnerabilities. Threat feeds can be generated through planning, collecting, processing, analyzing, and disseminating information that poses a threat to applications and systems. Threat intelligence collects information in real time to showcase the threat landscape for identifying threats to a computer, application, or network. This information is gathered from a number of resources and compiled into a single database enabling visibility into vulnerabilities and exploits actively being used on the internet by threat actors.

After ingesting one or more of these threat feeds, the system can determine whether a current workload at a particular point in the system presents a threat, and the system can determine what type of threat, allocating compensating controls that address that type of threat on the DPU and/or eBPF at that particular point in the system. For example, based on a threat score at a particular point in the system, DPU and/or eBPF controls can be placed in front of the workload to mitigate the risk.

By way of example, if the vulnerability scoring indicates that a workload is vulnerable to a Log 4J attack, then a DPU IPS with a Log 4J signature can be programmatically deployed in front of the workload (e.g. using a dynamically programmed overlay). Additionally, the system can install adjacency compensating controls to address similar or closely related attacks on the workload (e.g., the susceptibility to a Log 4J vulnerability might also indicate susceptibility to another Apache vulnerability, even if not indicated as such in the inputs).

Method 400 can also account for asset criticality in deciding whether a compensating control should be placed in front of a susceptible workload. By way of example, an asset that is vulnerable but is a low criticality asset may be a link to other web services that an employee would go to receive updates on their 401k. If such a link were compromised, users might be inconvenienced. Receiving updates on one's 401k is, however, not especially time sensitive, and receiving updates on one's 401k is not essential to an enterprise's core business. Thus, although a denial of services attack might be annoying because an employee cannot promptly access the desired information over a web server, the enterprise can nevertheless continue operations. In contrast, an asset such as a financial server can have a high asset criticality score. Thus, even if the financial server has less significant vulnerabilities, the risk posed by the financial server being taken out is significantly greater. Thus, Asset Criticality Scoring would inform the decision process regarding whether to place compensating controls in front of a workload and the degree of protection to be provided. That is, the decision space for where, when, and what compensating controls to dynamically deploy can be based on multi-dimensional data fusion that accounts for asset criticality in addition to the threat score and the type of threats and their relatedness to other types of threats.

Method 400 provides several advantages of traditional methods using firewalls only. Firewalls in traditional enterprises generally provide a fixed policy set (e.g., a fixed collection of firewall rules). If the security operations center (SOC) is concerned with preventing a particular exploit (e.g., a Log 4J exploit), then the available options when using firewalls are largely limited to using the firewall to place the Log 4J protection in the firewall, which is in front of all the workloads (i.e., the entire traffic). The firewall-only approach does not allow for more fine-grained consideration that takes into account the workload(s) behind this firewall. Thus, the brute-force, one-size-fits-all approach often used to address potential security concerns can result in applying protective measures (e.g., filtering packets based on IPS signatures) for vulnerabilities that may not even be exploitable in a given workload.

In contrast to the above-noted traditional methods, method 400 uses a more intelligent, fine-grained approach by placing security functions in front of a workload based on that workload being susceptible to a particular exploit.

For example, as discussed with reference to FIG. 3, one or more DPUs may be located in front (e.g. upstream of the traffic flow) of a vulnerable workload. Those one or more DPUs can be programmatically configured to execute a firewall function (e.g., compensating controls). And that firewall function can be tailored to protect only against the vulnerability (or vulnerabilities) to which that workload is susceptible. Additionally, the one or more DPUs can perform additional functions, such as enforcing network policies, blocking management ports or other functions, for example.

In addition to dynamically placing firewall functions (e.g., compensating controls) in front of the workload in a dynamic manner, method 400 can also tailor the network policies to what the actual vulnerability is on that workload. To better accomplish this, the determination of which firewall functions, compensating controls, and network policies are to be executed and by which network components can be informed by the various inputs discussed above, including, e.g., the vulnerability scoring and the asset-criticality scoring. Considerations that can contribute to these determinations can further include, e.g., how reachable is this workload in the network, and what other compensating controls are applied farther upstream relative to the workload and the DPU. For example, a workload that is buried deep inside an enterprise network can be less of a threat or risk than a workload for an edge web server that is serving content to users.

Further, these determinations can account for the limited computational resources available to appropriately weight and prioritize which compensating controls to apply. For example, workloads that are determined to have high asset-criticality scores can be prioritized over workloads with lower asset-criticality scores.

As would be understood by a person of ordinary skill in the art, the above factors upon which the determination is based are illustrative and non-limiting examples of the various factors that can be used to determine which firewall functions, compensating controls, and network policies are to be executed and by which network components they are to be executed.

According to certain non-limiting examples, the firewall functions, compensating controls, and network policies that are determined to be executed can be partially performed in respective network components. For example, the determined compensating controls can run in a DPU, they can run in an eBPF agent, or they can run in a combination of a DPU and an eBPF agent. For example, the compensating controls can be chained together. For example, if the compensating controls include core screening, some L3 enforcement (i.e., one or more L3 firewall functions), and L7 security controls (i.e., one or more L7 firewall functions), then the core screening and the L3 enforcement can be performed in the DPU, while the more fine-grained L7 security controls are performed by the eBPF agent.

By way of illustration, consider the Log 4J example discussed above. Upon discovery of the Log 4J vulnerability, vendors and enterprises can eventually patch their servers, but by the time the patch is applied significant time may have passed before the entire asset inventory is protected against that vulnerability. The advantage of method 400 is that, in contrast to the long lead time for patching the servers, compensating control can be pushed out and effectively protect the entire asset inventor much faster.

Further, method 400 can provide agile responses in view of developing information. For example, when a new vulnerability is discovered, vendors and enterprises may initially place compensating controls in front of a workload without complete information regarding whether it is vulnerable. For example, a vendor may know that the workload is running JAVA and they know that in general JAVA is vulnerable to Log 4J. But the vendor might now know whether that exact vulnerability is on that workload. In view of this uncertainty, the vendor may choose to apply a core screen compensating control in front of every JAVA server in their network. Later, the vendor can perform further analysis (e.g., KENNA analysis) to generate a vulnerability score, and based on this score, it can be determined that some of the workloads running JAVA are actually not vulnerable to Log 4J. Based on this result, the vendor can then remove some of those compensating controls in front of JAVA servers that are not vulnerable. This example illustrates one non-limiting aspect in which method 400 is dynamic. That is, the security system is able to expand and contract capability. Here, the vendor started by applying a coarse-grained set of protections in front of the JAVA servers. Then, as the vendor learns more about what is actually running on those Java servers, the vendor is able to either maintain the compensating controls or start removing them if the compensating controls are not providing any additional value.

A benefit of method 400 is the ability to dynamically remove compensating controls in addition to adding them. Each compensating control induces computational cost, which can take away compute capacity in the DPU from some other function that the DPU could be performing instead. Generally, the number of vulnerabilities increases, but as the workload evolves or changes some vulnerabilities may become no longer relevant to the workload. If, however, the vendor or SOC is unsure about a particular vulnerability, they may add another signature for that particular vulnerability, which adds computational overhead. This can be a problem in firewalls because the tendency for firewalls is for the number of rules to proliferate without removing any of the rules, resulting in as many as two thirds of the rules failing to provide actual value.

In contrast, method 400 provides a dynamic way to expand and contract the number of rules. For example, for a newly discovered vulnerability, method 400 might initially add 35 IPS signatures for which the DPU screens because initially, it is unclear for the workload(s) behind the DPU which vulnerabilities the workload is susceptible to and the potential impact of the vulnerability being compromised. Later as the vendor/developer learns more about the workloads running behind the DPU, they can start removing some of those signatures, and the remaining set of signatures on the DPU can be narrowly targeted to those specific vulnerabilities on the workload, like these are the set of things we need to look for.

Additionally, as time progresses, the software executed by the workloads can be patched to eliminate the vulnerability, and, when this occurs, the corresponding compensating controls are no longer needed and can be removed from in front of the patched workloads. When patches are applied on a rolling basis, it is beneficial that method 400 provides the flexibility to remove the compensating controls from in front of one workload (e.g., a patched workload) while maintaining the compensating controls in front of another workload (e.g., an unpatched workload).

When the compensating controls are performed in an eBPF agent rather than in the DPU, CPU cycles are used to perform the functions of the eBPF agent. Thus, removing unnecessary compensating controls from the eBPF agent has the benefit of freeing up the CPU to perform other functions.

By way of example, consider a case in which a compensating control is implemented in a system with a DPU and a switch that is followed by workloads consisting of Kubernetes clusters running Apache. Originally it made sense to implement the compensating controls on the DPU. Later, however, half of the Kubernetes clusters are patched so that they are no longer vulnerable. In view of this change, it can be more efficient to remove the compensating controls off of the DPU and into eBPF agents on the unpatched Kubernetes clusters. These eBPF agents can run the compensating controls in one of two layers: (i) on the Kubernetes stack itself (e.g., Kubernetes might be hosting 50 workloads in Docker, and the eBPF controls are performed inside of the OS running Kubernetes) or (ii) the eBPF controls can be implemented t in the Docker image (e.g. if the Docker image has a Linux OS as part of the Docker image, the eBPF controls can be performed in the Docker image). Similarly in a virtual machine (VM), the compensating controls can run in the underlying OS, in the guest, or in the host OS, depending on what the compensating controls are being used to protect. For example, if one host is being protected, the compensating controls would run in the guest. If all the guests are being protected, then the compensating controls would run in the host. That is the level at which the compensating controls are run depends on the desired granularity of protection.

In addition to providing different levels of granularity for how the compensating controls are applied, method 400 has the benefit that the compensating controls can be placed closer to the workload, ensuring that traffic reaching the workload has passed through the compensating controls. For example, in the non-limiting example of FIG. 3, the DPUs are closer to the workloads than the firewall in router 304. In some networks, there may be traffic that does not pass through the firewall. For example, consider a hardware appliance in a rack in your data center that is basically hair-pinning traffic through the hardware appliance. In this case, it is not guaranteed that all the traffic is going through that firewall. Further, there can be east-west paths between workloads that never pass through that firewall.

In the above scenario, if the firewall was the only protection, the network may be vulnerable to the type of exploit that gets into the data center and then moves laterally (e.g., moves east and west), and none of the packets for this type of vulnerability do not go through the firewall at the front of the data center. In contrast, the subsystem 300 in FIG. 3 would be protected against this type of vulnerability due to the distribution of the compensating controls among the DPUs and eBPF agents. By placing these functions as close to the workload as possible the east-west type of vulnerability can be mitigated. Placing the compensating controls close to the workload and, in the case of eBPG agents, running within/beneath the workload, can be realized by running the compensating controls in the DPU that is in the switch closest to the workload. This way, even if there is some east-west traffic, it has to go through the switch to get to the workload.

Figure 5:
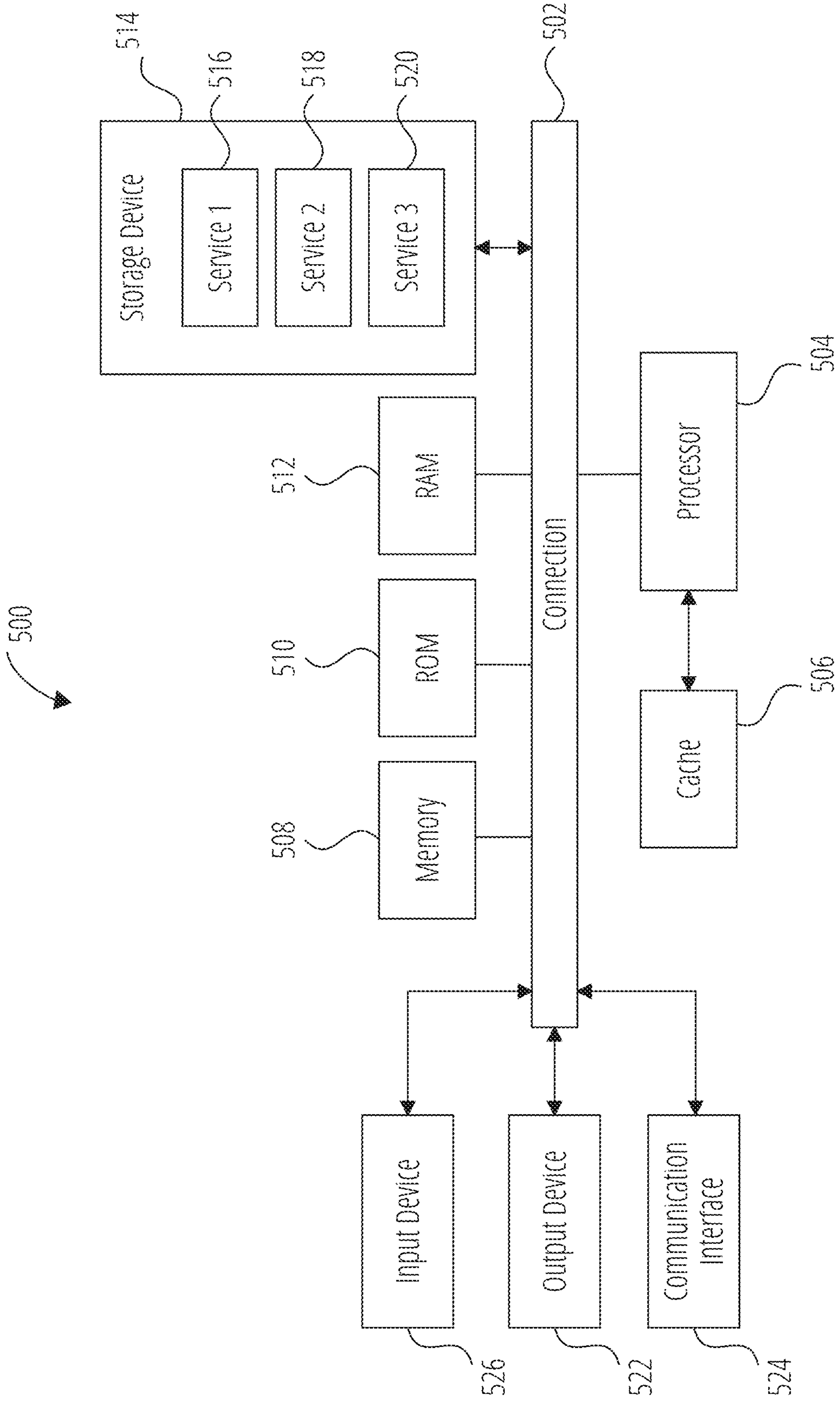
FIG. 5 illustrates a block diagram of an example of a computing device, in accordance with some embodiments.

FIG. 5 shows an example of computing system 500, which can be for example any computing device making up the internet edge security framework 100, data center 200, subsystem 300, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logic al connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) processor 504 and connection 502 that couples various system components including system memory 508, such as read-only memory (ROM) 510 and random access memory (RAM) 512 to processor 504. Computing system 500 can include a cache of high-speed memory cache 506 connected directly with, in close proximity to, or integrated as part of processor 504.

Processor 504 can include any general-purpose processor and a hardware service or software service, such as services 616, 618, and 620 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

storage device 514 can be a non-volatile memory device and can be a hard disk or other types of computer-readable media that can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, For example, instructions and data which cause or otherwise configure a general-purpose computer, special-purpose computer, or special-purpose processing device to perform a certain function or group of functions. Portions of computer resources used can be accessible over a network. The computer executable instructions may be, For example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for dynamically placing security controls in a network infrastructure, the method comprising:

ingesting a plurality of different types of input values from different sources that represent a workload in a network architecture, wherein the workload is arranged downstream from a network component such that ingress traffic passes through the network component before reaching the workload;

analyzing the input values to determine one or more security vulnerabilities of the workload;

in response to the analysis of the input values, selecting one or more compensating controls that protect the workload from the one or more security vulnerabilities of the workload; and performing instructions in the network component that dynamically placing, based on the analysis of the input values, the one or more compensating controls that are applied to data traffic passing through the network component to the workload.

2. The method of claim 1, wherein in the step of performing the instructions in the network component that implement the one or more compensating controls, the network component performing the instructions is a data processing unit (DPU), a Berkley packet filter (BPF), and/or an extended BPF (eBPF) capability.

3. The method of claim 1, further comprising:

analyzing the input values to determine an asset criticality of the workload; and in response to the analysis of the input values, selecting the one or more compensating controls based on both the asset criticality and the one or more security vulnerabilities of the workload.

4. The method of claim 1, wherein the input values comprise one or more vulnerability scores and/or one or more asset criticality scores, the vulnerability scores representing a degree to the workload is at risk of compromise due to predefined vulnerability, and the asset criticality scores representing a degree to which a compromise of the workload would impact a predefined goal.

5. The method of claim 1, further comprising:

receiving updated input values are updates to the input values that represent the workload;

updating, based on the updated input values, the analysis of the input values to determine the one or more security vulnerabilities of the workload;

based on the updated analysis, updating the one or more compensating controls that are selected to protect the workload from the one or more security vulnerabilities; and updating the instructions performed in the network component that implement the updated one or more compensating controls.

6. The method of claim 5, wherein, when updating the analysis of the input values results in a determination to remove a first security vulnerability from the one or more security vulnerabilities, a compensating control corresponding to the first security vulnerability is removed from the one or more compensating controls that are implemented by the instructions performed in the network component.

7. The method of claim 1, wherein the input values include:

(i) first information regarding trusted devices and/or trusted users that represents whether sources of the data traffic have indications of being trusted, (ii) second information regarding asset-criticality scoring that represents a degree to which a successful cyber attack of the workload would impact a predefined goal, (iii) third information regarding vulnerability scoring that represents degrees to which the workload is susceptible to respective vulnerabilities, (iv) fourth information regarding one or more threat feeds that represent threat intelligence regarding the respective vulnerabilities, (v) fifth information regarding a software bill of materials (SBOM) that represents a nested inventory of products making up software components running on the workload, and (iv) sixth information regarding a vulnerability exploitability exchange (VEX) that represents attestations indicating whether the products are affected by the vulnerabilities.

8. The method of claim 1, further comprising:

ingesting other input values that represent another workload in the network architecture, wherein the another workload is arranged downstream from another network component such that other ingress traffic passes through the network component before reaching the workload;

analyzing the other input values to determine another one or more security vulnerabilities of the another workload;

in response to the analysis of the another input values, selecting another one or more compensating controls that protect the another workload from the another one or more security vulnerabilities of the another workload; and performing another instructions in the another network component that implement the another one or more compensating controls that are applied to data traffic passing through the another network component to the workload, wherein the another one or more compensating controls differ from the one or more compensating controls due to differences between the another workload and the workload.

9. The method of claim 1, wherein the network component is directly before the workload such that all data traffic to the workload, including east-west data traffic, passes through the network component before reaching the workload.

10. The method of claim 1, further comprising:

applying a firewall to the data traffic before the data traffic reaches the network component, the firewall performing one or more firewall functions on the data traffic, and selecting the one or more compensating controls to avoid redundancy with firewall functions performed on the data traffic by the firewall.

11. The method of claim 1, wherein the one or more compensating controls are chained together such that core screening and Layer 3 enforcement are performed in a DPU and Layer 7 security controls are performed by an eBPF agent.

12. A computing apparatus comprising:

a processor; and a memory storing instructions that, when executed by the processor, configure the apparatus to:

ingest a plurality of different types of input values from difference sources that represent a workload in a network architecture, wherein the workload is arranged downstream from a network component such that ingress traffic passes through the network component before reaching the workload;

analyze the input values to determine one or more security vulnerabilities of the workload;

in response to the analysis of the input values, select one or more compensating controls that protect the workload from the one or more security vulnerabilities of the workload; and perform instructions in the network component that dynamically place, based on the analysis of the input values, the one or more compensating controls that are applied to data traffic passing through the network component to the workload.

13. The computing apparatus of claim 12, wherein the network component that performs the instructions is a data processing unit (DPU), a Berkley packet filter (BPF), and/or an extended BPF (eBPF) capability.

14. The computing apparatus of claim 12, wherein, when executed by the processor, the stored instructions further configure the apparatus to:

analyze the input values to determine an asset criticality of the workload; and in response to the analysis of the input values, select the one or more compensating controls based on both the asset criticality and the one or more security vulnerabilities of the workload.

15. The computing apparatus of claim 12, wherein the input values comprise one or more vulnerability scores and/or one or more asset criticality scores, the vulnerability scores representing a degree to the workload is at risk of compromise due to predefined vulnerability, and the asset criticality scores representing a degree to which a compromise of the workload would impact a predefined goal.

16. The computing apparatus of claim 12, wherein, when executed by the processor, the stored instructions further configure the apparatus to:

receive updated input values are updates to the input values that represent the workload;

update, based on the updated input values, the analysis of the input values to determine the one or more security vulnerabilities of the workload;

based on the updated analysis, update the one or more compensating controls that are selected to protect the workload from the one or more security vulnerabilities; and update the instructions performed in the network component that implement the updated one or more compensating controls.

17. The computing apparatus of claim 16, wherein, when updating the analysis of the input values results in a determination to remove a first security vulnerability from the one or more security vulnerabilities, a compensating control corresponding to the first security vulnerability is removed from the one or more compensating controls that are implemented by the instructions performed in the network component.

18. The computing apparatus of claim 16, wherein the input values include:

(i) first information regarding trusted devices and/or trusted users that represents whether sources of the data traffic have indications of being trusted, (ii) second information regarding asset-criticality scoring that represents a degree to which a successful cyber attack of the workload would impact a predefined goal, (iii) third information regarding vulnerability scoring that represents degrees to which the workload is susceptible to respective vulnerabilities, (iv) fourth information regarding one or more threat feeds that represent threat intelligence regarding the respective vulnerabilities, (v) fifth information regarding a software bill of materials (SBOM) that represents a nested inventory of products making up software components running on the workload, and (iv) sixth information regarding a vulnerability exploitability exchange (VEX) that represents attestations indicating whether the products are affected by the vulnerabilities.

19. The computing apparatus of claim 12, wherein, when executed by the processor, the stored instructions further configure the apparatus to:

ingest other input values that represent another workload in the network architecture, wherein the another workload is arranged downstream from another network component such that other ingress traffic passes through the network component before reaching the workload;

analyze the other input values to determine another one or more security vulnerabilities of the another workload;

in response to the analysis of the another input values, select another one or more compensating controls that protect the another workload from the another one or more security vulnerabilities of the another workload; and perform another instructions in the another network component that implement the another one or more compensating controls that are applied to data traffic passing through the another network component to the workload, wherein the another one or more compensating controls differ from the one or more compensating controls due to differences between the another workload and the workload.

20. The computing apparatus of claim 12, wherein the network component is directly before the workload such that all data traffic to the workload, including east-west data traffic, passes through the network component before reaching the workload.

* * * * *